United States Patent Office 3,264,275
Patented August 2, 1966

3,264,275
ELASTOMERIC INTERPOLYMERS COMPRISING ETHYLENE AND ACRYLONITRILE
Dexter B. Pattison, Wilmington, and Herman E. Schroeder, Hockessin, Del., assignors to E. I. du Pont de Nemours and Company, Wilmington, Del., a corporation of Delaware
No Drawing. Filed Feb. 15, 1965, Ser. No. 432,846
3 Claims. (Cl. 260—80.5)

This application is a continuation-in-part of application Ser. No. 119,843, filed June 27, 1961, and now abandoned.

This invention relates to novel copolymers and more particularly to ethylene-acrylonitrile elastomeric copolymers.

It is known that elastomers can be prepared by copolymerizing ethylene with various other copolymerizable monomers. Thus, ethylene-vinyl acetate and ethylene-propylene copolymers exhibit elastomeric properties in certain ranges of composition and molecular weight. Some of these elastomeric copolymers are either quite expensive to prepare or they do not have a wide range of desirable properties such as good thermal stability and good solvent resistance.

Ethylene-acrylonitrile copolymers have been described in the liteurature; however, all of the copolymers described are plastics and none of them is elastomeric in nature. In view of the fact that polyethylene and polyacrylonitrile are high melting plastics, it is quite surprising and unexpected to find that ethylene and acrylonitrile can be copolymerized to a highly useful elastomeric copolymer.

It is an object of the present invention to provide a novel ethylene-acrylonitrile copolymer. A further object is to provide an ethylene-acrylonitrile elastomeric copolymer possessing good elastomeric properties. A still further object is to provide a modified ethylene-acrylonitrile elastomeric copolymer containing pendant side chains bearing cross-linking sites. Another object is to provide a process for the preparation of these elastomeric copolymers.

These and other objects of this invention are accomplished by providing a uniform, elastomeric copolymer consisting of statistically distributed monomer units of (a) ethylene, (b) acrylonitrile, and (c)

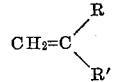

in the molar proportions or 1.7 to 5) (a):[m(b)+n(c)], wherein n is from 0 to 0.1 and (m+n) equals 1.0; R is selected from the group consisting of hydrogen and a methyl radical and R' is a radical selected from the group consisting of —COOH, —CONH$_2$, —COOCH$_2$CH$_2$OH,

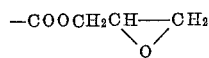

—COOCH$_2$CH=CH$_2$, —COOCH$_2$CH$_2$Cl and

—CONHCH$_2$CH=CH$_2$

A critical feature of the present invention is the value of the molar ratio of ethylene and the other monomer units in the copolymer. It has been found that when less than 1.7 or more than 5.0 moles of ethylene monomer units are present in an ethylene/acrylonitrile copolymer for every mole of acrylonitrile monomer units, the copolymers are non-elastomeric. By "elastomer" is meant a rubber-like substance, that is a material which has the ability to resist deformation and to recover quickly its original shape and size when the deforming forces are removed. The molar ratio of 1.7 to 5.0 described above corresponds to an ethylene/acrylonitrile copolymer containing 47.2 to 72.5 weight percent ethylene or 62.9 to 83 mole percent ethylene. The preferred elastomeric ethylene/acrylonitrile copolymer contains from about 2.6 to 4 moles of ethylene units per mole of acrylonitrile units. This corresponds to an ethylene/acrylonitrile copolymer containing 58 to 67.8 weight percent ethylene or 72.5 to 80 mole percent ethylene. In addition to ethylene and acrylonitrile, any one or more of the monomers

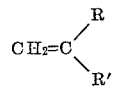

can be present, if desired, wherein R and R' are defined above. The preferred maximum total concentration of monomers

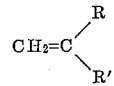

in the copolymer is 3.7 mole percent. In all copolymers, the molar ratio of ethylene monomer units to the sum of all the other monomer units ranges from 1.7:1 to 5.0:1. The monomers

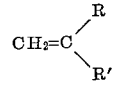

which may be used in conjunction with ethylene and acrylonitrile include acrylic acid, methacrylic acid, acrylamide, methacrylamide, β-hydroxyethyl acrylate, β-hydroxyethyl methacrylate, glycidyl acrylate, glycidyl methacrylate, allyl acrylate, allyl methacrylate, β-chloroethyl acrylate, β-chloroethyl methacrylate, N-allyl acrylamide and N-allyl methacrylamide. Representative copolymers within the scope of this invention have inherent viscosities (0.1% solution by weight in chloroform at 30° C.) ranging from 0.3 to 1.8. The inherent viscosity measurements can also be made in dimethyl formamide when the copolymers are completely soluble in it.

The copolymers of the present invention are uniform in composition. The term "uniform" is taken to mean that the product is a statistical copolymer, as contrasted with a block copolymer. With respect to the term "uniform," the following quotations from volume XVIII of "High Polymers" [Copolymerization, Ed. G. E. Ham, Interscience Publishers, New York, 1964] are illustrative of the art:

Page 149—"In statistical copolymers, the various monomers come into contact with the initiator or a growing chain and react individually or statistically alternating in short sequences to form macromolecules of the structure AABBBABAAABABB. In general, initiators are used that respond to all the monomers used according to the same or to a very similar mechanism. The ratio in which the monomers are built into the polymers frequently differs from the amount applied during the polymerization reaction because the reactivity of the monomers and the polarity of their double bonds are different.

"In the methods currently employed for the preparation of ethylene containing block copolymers, the various monomers, as in graft polymerization, are polymerized successively, if necessary, in alternating repetition."

Page 335—"The block copolymer is composed of relatively long sequences of different polymer segments chemically linked to form a linear molecule."

The distribution of monomer units $m_1$, $m_2$, ... in a statistical copolymer depends on the respective relative reactivities, $r_1$, $r_2$, ... of the monomers present in the reaction mixture. If, in a binary copolymerization, the product $r_1 r_2$ of the relative reactivities $r_1$ and $r_2$ is 1.0, the resulting *statistical copolymer* has its monomer units $m_1$ and $m_2$ *randomly* distributed. Strictly, only when $r_1 r_2 = 1.0$ should the term "random" be used.

The following rules are applicable to the distribution of monomer units in the chain of a statistical copolymer:

(a) If $r_1 = r_2 = 0$, the monomer units are incorporated in an alternating fashion, i.e.,

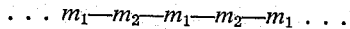

(b) If $r_1 > 0$, $r_2 = 0$ (and $r_1 r_2 = 0$), the chain can be described as

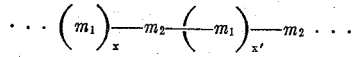

where $x$, $x'$ etc. = 1, 2, 3 ... that is, each $m_2$ unit is connected to another by short "runs" of $m_1$.

(c) If $r_1 > 0$, $r_2 > 0$ and $r_1 r_2 = 1.0$, the distribution of monomer units, by definition, is *random*; in the special case where $r_1 = 1$, $r_2 = 1$, $r_1 r_2 = 1$, the monomers being equally reactive, the random copolymer being formed will have the same composition as the monomer feed at that time.

(d) If $r_1 > 0$, $r_2 > 0$, but $r_1 r_2 < 1.0$, the monomer distribution will be somewhat intermediate between that in (b) and (c) above.

In the present instance, the elastomeric copolymers fall within category (d).

The copolymers of the present invention are rubberlike. Their nature is thus essentially amorphous and atactic. The term "uniform" is not intended to imply that the copolymers are highly stereoregular, as for example in the well-known isotactic polypropylene.

The novel copolymers of the present invention can be prepared by contacting ethylene, acrylonitrile and, if desired, any of the other monomers, optionally in solution, with free radical catalysts at temperatures between about 20 and 250° C. (150–220° C. being preferred) at superatmospheric pressures in the absence of oxygen.

Ditert-butylperoxide is a preferred catalyst for use in the preferred temperature range. Azodicyclohexane carbonitrile is preferred when polymerizations are done in the neighborhood of 100° C. However, any of the dialkyl peroxides, diacyl peroxides, substituted azoacetonitriles, tertiary alkyl hydroperoxides, and the like customarily used for initiating free radical polymerizations may be used. Since the half life for the thermal decompositions of each of these catalysts is a function of temperature, a reaction temperature should be selected at which the catalyst is known to decompose at a convenient rate. The following catalysts are offered as merely illustrative; the temperature in degrees centigrade at which the half life is 1 hour is given inside the parentheses: trichloroacetyl peroxide (10°); heptafluorobutyryl peroxide (35°); alpha,alpha'-azobis(alpha,gamma, gamma-trimethyl valeronitrile)(45°); alpha,alpha' - azobis (alpha,gamma-dimethylvaleronitrile)(68°); lauroyl peroxide (in benzene, 79°); alpha,alpha'-azodiisobutyronitrile (82°); acetyl peroxide (in toluene, 89°); benzoyl peroxide (in benzene, 95°); azodicyclohexane carbonitrile (105°); tertiary butylperacetate (in benzene, 123°); dicumyl peroxide (in dodecane, 138°). Water soluble catalysts such as ammonium persulfate, potassium persulfate, di-tert-butyl peroxy dicarbonate, and potassium azodisulfonate can be used. Additional free radical catalysts are described in the November 1960 issue of Petroleum Refiner on pages 186 to 189. When desired, mixtures of free radical catalysts can be used. Ultraviolet radiation can be used in place of these catalysts.

In general, about 0.02 to 1.0 weight percent of catalyst is used based on the total weight of monomer present. A preferred concentration is about 0.05 to 0.2 weight percent. The catalyst concentration which will give optimum results can readily be determined by empirical means.

A bulk process is preferred for the copolymerization in order to reduce whatever tendency there is toward chain transfer at the preferred high temperature range; however, the free radical reactions may be carried out in an inert solvent, particularly at temperatures of 100° C. or below. By inert solvent is meant any conventional solvent for a free radical reaction wherein the solvent does not interfere with the desired course of the reaction. The preferred inert solvents for ethylene/acrylonitrile copolymerizations are methyl formate, tertiary butyl formate, and tertiary butyl alcohol. Representative examples of other inert solvents include benzene and methyl acetate. Those skilled in the art will readily understand that when monomers

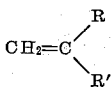

are present, the solvent must not react with the functional group in R'; thus alcohols are not used as a reaction solvent when R' is terminated by an epoxy group. The proportion of monomer to solvent convenient for carrying out the reaction can readily be determined. By way of illustration, solutions containing about 160 grams of monomers per 100 grams of tertiary butyl alcohol have been very satisfactory for preparing ethylene/acrylonitrile copolymers at temperatures in the range of about 60 to 100° C. Although the copolymerization can also be done in an aqueous emulsion, it is less satisfactory because acrylonitrile is water-soluble; it is preferred to carry out the reaction in an oil phase where ethylene is more soluble.

The free radical catalyzed reaction is carried out at superatmospheric pressure. Other factors remaining constant, the higher the pressure, the higher the copolymer molecular weight. The molecular weight increases by a factor of 10 over the operating pressure range 1200 to 2800 atmospheres. The pressure best suited for operation at a particular temperature for a particular free radical catalyst can readily be determined. The pressure used ranges from about 900 to at least 3000 atmospheres. Pressures above 2500 atmospheres are preferred; this gives copolymers with inherent viscosities (0.1% by weight solution in chloroform at 30° C.) of 1.2 to 1.8 and Wallace Plasticities of 30 to 50. Pressures above 3000 atmospheres are satisfactory but the operation is less convenient. At pressures below 900 atmospheres the copolymers tend to be viscous low molecular weight materials.

The biggest difficulty in making an ethylene-acrylonitrile copolymer is the large difference in reactivity between the two monomers. For ethylene and acrylonitrile copolymerizations under representative operating conditions, values of $r_1$ in the range 0.01 to 0.05 and $r_2$ in the range 3 to 6.7 have been found, when ethylene is monomer 1 and acrylonitrile is monomer 2 by the equation $$r_2 = \frac{M_1}{M_2}\left[\frac{m_2}{m_1}\left(1+\frac{M_1 r_1}{M_2}\right)-1\right]$$

where $M_1$ and $M_2$ are the mole fractions of monomers 1 and 2, respectively, in the starting mixture; $m_1$ and $m_2$ are the mole fractions of monomers 1 and 2, respectively, in the copolymer. Acrylonitrile is thus considerably more reactive than ethylene. Monomers

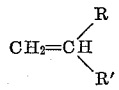

are usually more reactive than ethylene.

In order to make the elastomeric, rubber-like copolymers of the present invention, it is absolutely essential that the copolymerization process itself be carried out so that a statistical copolymer will result having the monomer composition ratios specified above. As mentioned earlier, both polyethylene and polyacrylonitrile are high melting plastics. A mechanical mixture of the homopolymers, even when supplying 1.7 to 5 moles of ethylene monomer units for every mole of acrylonitrile units, will not be elastomeric; nor will block copolymers made by grafting the homopolymers in these ratios. It is also insufficient to operate the copolymerization in such a way that non-uniform products result. For example, if ethylene and acrylonitrile are reacted at an unduly low ethylene pressure, the highly reactive acrylonitrile will tend to be the predominant component in the polymer product first formed; after the acrylonitrile-rich fraction has formed, an ethylene-rich fraction will follow. The overall product will be "blocky," non-uniform, and non-elastomeric—even though the over-all monomer unit composition may contain 1.7 to 5 moles of ethylene for each mole of acrylonitrile.

In order to make a uniform copolymer having 1.7 to 5.0 moles of ethylene monomer units per mole of total comonomer units, about 30 to 90 parts of ethylene should be supplied for every part of total comonomer. In order that the copolymer composition resulting from a batch copolymerization be uniform, it is generally necessary to stop the copolymerization at a conversion of about 35 percent or less based on the acrylonitrile charged. However, in a continuous copolymerization, if the monomer composition at all times during the reaction is maintained at the proper ratio, considering the temperature and pressure employed, there is no need to limit the conversion because the product will be uniform.

The reaction is generally carried out in pressure vessels such as autoclaves or bombs. The reaction vessel lining can be any material, such as glass, stainless steel, or nickel, which does not affect the desired course of the reaction.

The copolymers can be made by the following general procedure: An evacuated stainless steel shaker tube, purged with nitrogen to remove atmospheric oxygen, is charged at room temperature with a solution containing the catalyst and all monomers except ethylene. After being subsequently cooled for about 3 to 10 minutes in Dry Ice, it is charged with ethylene and heated to the reaction temperature suitable for the free radical catalyst employed. The shaker tube is then agitated at the reaction temperature for a time long enough to consume up to about 35 percent of the acrylonitrile (e.g., 1 to 3 hours at 95° C.). Afterward the tube is cooled to room temperature and excess ethylene is vented off. The elastomeric copolymer, precipitated by concentrating the reaction mixture and adding isopropanol, is filtered, washed with isopropanol, and dried in a vacuum oven at about 50° C. The copolymer can also be isolated by evaporative distillation or by conventional drum-drying or mill-drying techniques.

The copolymers of the present invention can be prepared by a continuous process at superatmospheric pressure. Thus, monomers and catalyst, and optionally inert solvent, can be introduced into a polymerization zone at such a rate as to provide a residence time sufficient to maintain the proper composition and to build up the desired concentration of copolymer in the polymerization medium. The heretofore described conditions can be observed; thus about 30 to 90 parts of ethylene are supplied for every part by weight of total comonomer; about 0.02 to 1.0 part of catalyst is introduced for every 100 parts by weight of total monomers; the conversion can range up to about 35 percent based on the acrylonitrile charged; temperatures of 20 to 220° C. and pressures of 1000 to 3000 atmospheres are suitable. Continuous or batch procedures can be used to recover the copolymer product from the reaction mixture which continually overflows from the polymerization zone.

The rubbery novel copolymers of this invention may be cured by a wide variety of free radical curing procedures to form highly useful elastomers. In carrying out a free radical cure of the copolymers, it is merely necessary to mix, by standard procedures, a free radical generator with the copolymer and to heat until a cure is obtained. The temperature range may vary within wide limits, depending upon the particular free radical generator being used. However, heating to temperatures of about 50° to 175° C. for a period of 30 minutes to several hours is ordinarily adequate. Longer times may be used in the case of the more thermally stable free radical generators.

The preferred free radical generators which may be incorporated with the copolymers are organic peroxides. Representative examples are bis(alpha,alpha-dimethylbenzyl) peroxide, dibenzoyl peroxide, di-tert-butyl peroxide, cumene hydroperoxide, methyl ethyl ketone peroxide, tert-butyl perbenzoate and di-N-methyl-tert-butyl percarbamate. Bis(alpha,alpha-dimethylbenzyl)peroxide (often called dicumyl peroxide) and 2,5-bis(tert-butyl peroxy)-2,5-dimethyl hexane are particularly preferred. About 1 to 3 parts by weight is used for every 100 parts by weight of the elastomeric copolymer. The compounded stock is then cured at about 150° C. for about 30 to 60 minutes.

In addition to the free radical generator, a free radical acceptor may be present such as N-substituted maleimide, and N,N'-substituted bismaleimide, an N,N'-substituted bisacrylamide, a cyclic triacryloylhexahydrotriazine, or mixtures thereof. The quantity of free radical acceptor may range from about 0.5 percent to 6 percent by weight of the copolymer. The weight of the free radical acceptor may be less, equal to, or more than the weight of the free radical generator.

The maleimides are compounds having the formula:

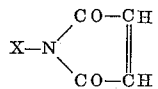

wherein X is an alkyl or an aryl radical. Representative maleimides include compounds such as N-methyl maleimide, N-phenyl maleimide and N-pyrenyl maleimide. The bismaleimides may be represented by the formula:

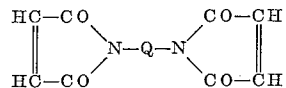

wherein Q is an alkylene or an arylene radical. Representative bismaleimides include N,N'-ethylene bismaleimide, N,N'-phenylene bismaleimide and N,N'-pyrenylene bismaleimide. The bisacrylamides which may be used in the process of the present invention may be represented by the formula:

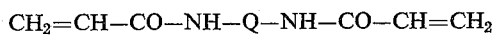

wherein Q is an alkylene or an arylene radical. Representative compounds include methylene bisacrylamide and phenylene bisacrylamide.

A wide variety of compounding agents may be incorporated with these elastomeric copolymers at the time they are cured in order to improve various properties. Thus, they may be loaded with carbon black in order to increase the tensile strength. Other compounding agents include sulfur, N,4-dinitroso-N-methyl aniline, titanium dioxide and silica.

The modified ethylene-acrylonitrile elastomers containing incorporated

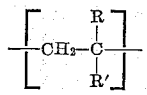

monomer units, wherein R and R' are as defined above, possess reactive pendant groups which permit other modes of curing, when desired. Representative examples of reactive groups and curing agents with which they would be reacted are as follows:

| Curing agent: | Reactive group |
|---|---|
| Organic polyisocyanate | Hydroxyl. |
| Diepoxide | Hydroxyl, carboxyl. |
| Sulfur | Allyl. |
| Magnesium oxide | β-Chloroethoxy. |
| Polyamine | Epoxy. |
| Formaldehyde | Amido. |

The copolymers of this invention have many varied uses. They may be employed in the preparation of tires, inner tubes, belts, hose and tubing, wire and cable jackets, footwear, sponges, coated fabrics, and a wide variety of coated or molded articles. The cured copolymers are characterized by excellent oil resistance, good thermal stability and excellent resistance to ozone. The uncured but compounded copolymers are not affected by moisture but can be stored for lengthy periods before shaping and vulcanizing.

The following examples will better illustrate the nature of the present invention; however, the invention is not intended to be limited to these examples. Parts are by weight unless otherwise indicated.

*Example 1*

An evacuated nitrogen-flushed 200-milliliter stainless steel shaker tube was charged at room temperature (about 25° C.) with acrylonitrile (4 parts) containing 0.0008 part of phenothiazine antioxidant, tert-butanol (50 parts) and azodicyclohexane carbonitrile (0.05 part). The shaker tube was cooled in a Dry Ice mixture, put in a shaking device behind a barricade, and charged with ethylene (52.4 parts). The tube temperature was raised to 95° C. and more ethylene was added every half hour until the total pressure was 3,000 atmospheres. The tube was shaken continually. The data obtained during the reaction are given in Table I which follows:

TABLE I

| Time, min. | Temperature (0° C.) | Gauge Pressure (atmospheres corrected) | Ethylene injected (parts) |
|---|---|---|---|
| 0 | 94 | 264 | 52.4 |
| 30 | 95 | 561.0 | |
| 60 | 95 | 1,020 | 71.7 |
| 90 | 95 | 1,570 | 79.2 |
| 120 | 96 | 2,000 | 84.2 |
| 150 | 95 | 2,560 | 89.2 |
| 180 | 96 | 2,970 | 93.2 |

The heat was shut off and the shaker tube was allowed to cool to room temperature (about 25° C.) while being agitated. The shaker tube was then opened and emptied. Benzene (2 milliliters) containing 1 percent by weight p-tert-butyl catechol was added to the solution which was thereafter evaporated to a volume of 50 milliliters. The insoluble polymer was separated, washed with isopropyl alcohol, and dried in a vacuum oven at 50° C. for 20 hours. A hard ethylene/acrylonitrile copolymer (0.92 part) was obtained which was somewhat resinous. This copolymer exhibited an inherent viscosity of 0.76 (0.1 percent by weight solution in dimethyl formamide at 30° C.) and contained 16.2 percent Kjeldahl nitrogen, corresponding to 61.4 weight percent (43.8 mole percent) acrylonitrile monomer unit; thus there were 1.29 moles of ethylene monomer units per mole of acrylonitrile monomer units in this copolymer. This example shows that when there are less than 1.7 moles of ethylene units per mole of acrylonitrile units, an elastomer is not obtained.

*Example 2*

Acrylonitrile (2 parts), tert-butanol (50 parts), and azodicyclohexane carbonitrile (0.5 part) were charged into a nitrogen flushed evacuated 200-milliliter stainless steel shaker tube at about 25° C. The shaker tube was cooled thereafter in a Dry Ice bath, put in a shaking device behind a barricade. Ethylene (92 parts) was introduced and external heat applied.

The shaker tube was agitated for 2 hours at 95° C. The pressure during that time dropped from 2660 atmospheres. The external heat was then shut off and the shaker tube was allowed to cool to room temperature while being shaken. Excess ethylene was vented. The tube was thereafter opened and its contents were discharged into a bottle. Acetone tube washings were combined with it. To this mixture was then added: 2 milliliters of a benzene solution containing 1 percent by weight N-phenyl-beta-naphthylamine and 0.10 percent by weight p-tert-butyl catechol; 50 milliliters of isopropanol. This mixture was then allowed to evaporate at room temperature (about 25° C.) at atmospheric pressure for a period of about 16 hours. At the end of this time about 0.5 to 1 part of a rubbery solid had separated from the remaining 5 milliliters of solvent. After 20 milliliters of isopropanol had been introduced, the insoluble material was filtered. It was found to be partly soluble in 30 milliliters of acetone at 25° C. The acetone insoluble fraction was filtered off and dried in a vacuum oven at 50° C. for 4 hours to give 0.49 part of an attractive elastomer having a high modulus and tensile strength for an uncured material.

This elastomer exhibited the following characteristics: Inherent viscosity (0.1 percent by weight solution in dimethyl formamide at 30° C.) 0.50; nitrogen 12.8 percent (Kjeldahl); weight percent of acrylonitrile monomer units 48.5; mole percent of acrylonitrile monomer units 33.2; moles of ethylene monomer units per mole of acrylonitrile monomer units 2.02.

*Example 3*

The procedure of Example 2 was repeated except as noted below.

A 200-milliliter stainless steel shaker tube was charged at 25° C. with a solution containing acrylonitrile (3 parts), azodicyclohexane carbonitrile (0.05 part), and methyl formate (60 parts). After this tube had been cooled, ethylene (93 parts) was introduced.

The mixture was shaken at a temperature ranging between 92 and 95° C. for an hour, and two hours at 95 to 103° C. The pressure during this period ranged between 2600 and 2675 atmospheres.

After the cooling and venting off of the ethylene, the shaker tube was opened. To the mixture removed therefrom was added 1 milliliter of a benzene solution containing 0.4 percent by weight N-phenyl betanaphthylamine and 1 percent by weight tert-butyl catechol. The reaction mixture was then allowed to evaporate at 25° C. for 2 hours; thereafter, an equal volume of isopropyl alcohol was introduced. The copolymer which separated was filtered from the mother liquor and dried in a vacuum oven at 50° C. for 3 hours. An elastomer was obtained weighing 1.29 parts and exhibiting the following characteristics:

Inherent viscosity (0.1% by weight solution in dimethylformamide at 30° C.) _____ 0.52
Nitrogen (Kjeldahl), percent _____ 12.9
Weight percent of acrylonitrile monomer units ___ 48.7
Mole percent of acrylonitrile monomer units _____ 33.3
Moles of ethylene monomer units per mole of acrylonitrile monomer units _____ 2.00

*Example 4*

The procedure of Example 3 was repeated except as noted below.

A 200-milliliter stainless steel shaker tube was charged at 25° C. with acrylonitrile (1.5 parts), azodicyclohexane carbonitrile (0.05 part), methyl formate (60 parts), and ethylene (96.5 parts). The tube was thereafter heated for 2 hours at 95° C. while shaken under a pressure of 2700 atmospheres. The copolymer was isolated by a method similar to that described in Example 3. After drying in a vacuum oven for 16 hours at 50° C., a fairly good rubber (0.89 part) was obtained exhibiting the following characteristics:

Inherent viscosity (0.1% by weight solution in cyclohexanone at 30° C.) _____ 0.53
Inherent viscosity (0.1% solution by weight in dimethylformamide at 30° C.) _____ 0.93
Percent nitrogen (Kjeldahl) _____ 10.6
Weight percent acrylonitrile _____ 40.3
Mole percent of acrylonitrile _____ 26.2
Moles of ethylene monomer units per mole of acrylonitrile monomer units _____ 2.81

*Example 5*

The procedure of Example 1 was repeated except as noted below.

A 200-milliliter stainless steel shaker tube was charged at 25° C. with acrylonitrile (0.8 part, containing 0.00016 part phenothiazine), azodicyclohexane carbonitrile (0.05 part), methyl formate (60 parts), and ethylene (94.5 parts). The tube was shaken at 95° C. for 75 minutes at 2660 atmospheres. A solid resinous copolymer (1.37 parts) was obtained exhibiting the following properties:

Inherent viscosity (0.1% by weight solution in dimethylformamide at 30° C.) _____ 0.52
Percent soluble material in dimethylformamide __ 49
Percent nitrogen (Kjeldahl) _____ 5.8
Weight percent of acrylonitrile monomer units __ 22.0
Mole percent of acrylonitrile monomer units _____ 13.0
Moles of ethylene/mole of acrylonitrile monomer units _____ 6.72

This example shows that if the copolymer contains too much ethylene, the product is a non-elastomeric resin rather than an elastomer.

*Example 6*

The procedure of Example 3 was used except as noted below.

A 400-milliliter stainless steel shaker tube was charged at 25° C. with acrylonitrile (3 parts), azodicyclohexane carbonitrile (0.15 part), methyl formate (120 parts) and ethylene (188 parts). It was then heated, over a period of 1 hour to 95° C. and maintained at 95° C. for two hours at a pressure ranging between 1105 and 1120 atmospheres. An elastomer (1.57 parts) exhibiting the following characteristics was obtained:

Inherent viscosity (0.1% by weight solution in dimethylformamide at 30° C.) _____ 0.46
Percent nitrogen (Kjeldahl) _____ 12.9
Weight percent of acrylonitrile monomer units ____ 48.7
Mole percent of acrylonitrile monomer units ___ 33.3
Moles of ethylene monomer units/mole of acrylonitrile monomer units _____ 2.00

*Example 7*

The procedure of Example 3 was used except as noted below.

A 400-milliliter stainless steel shaker tube was charged with acrylonitrile (1.5 parts), azodicylohexane carbonitrile (0.15 part), methyl formate (120 parts), and ethylene (188 parts). The tube was shaken thereafter for 2 hours at 95° C. at a pressure of 1035 atmospheres to 1005 atmospheres. There was a pressure drop of 30 atmospheres during this run. The entire reaction mixture was allowed to evaporate at 25° C. at atmospheric pressure for two days. Then isopropanol (40 milliliters) was added and the mixture was allowed to stand for 1 hour. The copolymer thereby precipitated was collected by conventional filtration, rinsed with isopropanol, and dried for 18 hours in a 40° vacuum oven. There was obtained 0.95 part of a sticky rubber which exhibited the following characteristics:

Inherent viscosity (0.1% by weight solution in dimethylformamide at 30° C.) _____ 0.22
Percent nitrogen (Kjeldahl) _____ 8.7
Weight percent of acrylonitrile monomer units ___ 32.9
Mole percent of acrylonitrile monomer units _____ 20.6
Moles of ethylene monomer units/mole of acrylonitrile monomer units _____ 3.87

*Example 8*

The procedure of Example 3 was repeated except as noted below.

A 400-milliliter stainless steel shaker tube was charged at 25° C. with acrylonitrile (4.0 parts), azodicyclohexane carbonitrile (0.15 part), tert-butyl alcohol (100 parts), and ethylene (180 parts). Thereafter it was heated for 2 hours at 95° C. and 1 hour at 100° C. while being agitated under a pressure ranging between 900 and 910 atmospheres. The copolymer was isolated as before, except that the crude copolymer was dissolved in 30 milliliters of acetone and reprecipitated with 50 milliliters of methanol. After drying in a vacuum at 50° C., a very sticky rubber weighing 0.83 part was obtained exhibiting the following characteristics:

Inherent viscosity (0.1% by weight solution in dimethylformamide at 30° C.) _____ 0.21
Percent nitrogen (Kjeldahl) _____ 13.0
Weight percent of acrylonitrile monomer units ____ 50.7
Mole percent of acrylonitrile monomer units _____ 35.2
Moles of ethylene monomer units/mole of acrylonitrile monomer units _____ 1.84

*Example 9*

The procedure of Example 3 was followed except as noted below.

A 400-milliliter stainless steel shaker tube was charged at 25° C. with acrylonitrile (8 parts), azodicyclohexane carbonitrile (0.20 part), tert-butanol (100 parts), and ethylene (180 parts). It was then agitated at 95° C. for 2 hours and at 100° C. for 1.5 hours; the pressure was about 1000 atmospheres. The solid insoluble copolymer was filtered off the reaction mixture. After drying there was a non-elastomeric resin (0.92 part) exhibiting the following characteristics:

Inherent viscosity (0.1% by weight solution in dimethylformamide at 30° C.) _____ 0.23
Percent nitrogen (Kjeldahl) _____ 15.3
Weight percent acrylonitrile monomer units _____ 57.7
Mole percent acrylonitrile monomer units _____ 31.8
Moles of ethylene monomer units/mole of acrylonitrile monomer units _____ 1.4

This example shows that when the amount of ethylene in the copolymer is less than 1.7 moles per mole of acrylonitrile, an elastomer is not obtained.

Example 10

The procedure of Example 3 was followed except as noted below.

A 400-milliliter stainless steel shaker tube was charged at 25° C. with acrylonitrile (6 parts), azodicyclohexane carbonitrile (0.15 part), methyl formate (120 parts), and ethylene (183 parts). It was then heated over a 25-minute period to 95° C. and maintained for 2 hours at 95° C. under a pressure ranging between 970 and 980 atmospheres; the temperature was raised over a 20-minute interval to 100° C.; thereafter, the shaker tube was heated at 100° C. under a pressure ranging between about 1000 and 1010 atmospheres. There was obtained a sticky light brown elastomer weighing 1.28 parts and exhibiting the following characteristics:

| | |
|---|---|
| Inherent viscosity 0.1% by weight solution in dimethylformamide at 30° C.) | 0.24, 0.25 |
| Percent nitrogen (Kjeldahl) | 15.8 |
| Weight percent acrylonitrile monomer units | 52.3 |
| Mole percent acrylonitrile monomer units | 36.7 |
| Moles of ethylene monomer units/mole of acrylonitrile monomer units | 1.72 |

Example 11

The procedure of Example 3 was repeated except as noted below.

A 400-milliliter stainless steel shaker tube was charged at 25° C. with acrylonitrile (0.8 part, containing 200 parts per million phenothiazine antioxidant), azodicylohexane carbonitrile (0.15 part), methyl formate (120 parts). It was thereafter shaken at 95° C. under a pressure of 1010 to 1040 atmospheres for 2 hours.

A weak, non-elastomeric resin was filtered from the reaction mixture, which after drying weighed 0.26 part.

| | |
|---|---|
| Inherent viscosity (0.1% by weight solution in dimethylformamide at 30° C.) | 0.24 |
| Percent nitrogen (Kjeldahl) | 6.8 |
| Weight percent acrylonitrile monomer units | 25.5 |
| Mole percent acrylonitrile monomer units | 15.3 |
| Moles of ethylene monomer units/mole of acrylonitrile monomer units | 5.54 |

This example shows that when the amount of ethylene in the copolymer is greater than 5.0 moles per mole of acrylonitrile, an elastomer is not obtained.

Example 12

This example demonstrates the preparation of an ethylene-acrylonitrile elastomer at 60° C. using an aqueous polymerization system. In a 200-milliliter stainless steel shaker tube there was charged by the method of Example 1 a mixture consisting of:

| | |
|---|---|
| Water, milliliters | 65 |
| 2,2'-azobis(2-methylpropionitrile), part | 0.08 |
| Sodium bisulfite, part | 0.2 |
| Potassium dihydrogen phosphate, part | 1.0 |
| Acrylonitrile, parts | 1.2 |

The shaker tube was pressured with 95 parts of ethylene which was added in stages to obtain 2860 atmospheres pressure at 60° C. After the tube had been heated while rapidly shaken for four hours at 60° C., it was cooled and emptied into a bottle. The copolymer was washed twice with water and twice with isopropanol. It was then dried in a vacuum oven overnight at 50° C. The yield: 0.42 part of a light tan rubber having an inherent viscosity in dimethyl formamide of 0.57 with 95% soluble (measured in a 0.1% solution at 30° C.). The Kjeldahl nitrogen analysis was 12.8% N, indicating that the copolymer had 2.02 moles of ethylene monomer units per mole of acrylonitrile monomer units.

Example 13

This example demonstrates the preparation of an ethylene-acrylonitrile elastomer using 2,2'-azobis(2,2'-methylvaleronitrile) as the catalyst in a solvent system. In a 200-milliliter stainless steel shaker tube there was charged by the method of Example 1 a solution of:

| | Parts |
|---|---|
| Methyl formate | 60 |
| 2,2'-azobis(2,2'-methylvaleronitrile) | 0.05 |
| Acrylonitrile | 1.2 |

The shaker tube was pressured with 98 parts of ethylene added in stages to raise the initial pressure to 2850 atmospheres. The tube was heated for five hours at 60° C.; during this time the pressure fell from 2850 to 2790 atmospheres. The tube was then cooled, and the contents emptied into a bottle containing 1 milliliter of a benzene solution containing 1% N-phenyl β-naphthylamine and 1% p-tert-butyl catechol; acetone rinses of the shaker tube were combined with this material. The mixture was allowed to evaporate overnight. Then 10 milliliters of isopropanol was added. The rubber which separated was washed twice with isopropanol and dried in a vacuum oven at 50° C. The yield was 0.94 part of a fairly tough brown elastomer, which had an inherent viscosity of 0.52 with 97 percent soluble in dimethylformamide at 30° C. The Kjeldahl nitrogen analysis was 11.0% N indicating that the copolymer had 2.65 moles of ethylene monomer units per mole of acrylonitrile monomer units.

Example 14

The ethylene-acrylonitrile copolymer employed was prepared by a procedure similar to that described in Example 4 and had an inherent viscosity of 0.48 (0.1% by weight solution in dimethyl formamide at 30° C.) and contained 38 percent acrylonitrile monomer units by weight; the value of the molar ratio of ethylene:acrylonitrile monomer units was 3.1.

This copolymer was compounded on a rubber roll mill at 80 to 110° C. in accordance with the following recipe:

| | Parts (by weight) |
|---|---|
| Copolymer | 100 |
| High abrasion furnace black | 50 |
| Dicumyl peroxide | 2.4 |
| Calcium carbonate | 3.6 |
| Phenylenediamine bismaleimide | 2.4 |

The vulcanizate obtained after heating this composition in a mold at 155° C. for one hour was a rubbery solid which could be elongated about 200 percent. Strips were cut and immersed in various solvents for 12 days at 25° C.; the solvent swell which occurred was as follows:

| Solvent: | Percent swell |
|---|---|
| Toluene | 114 |
| Hexane | 10 |
| Acetone | 135 |

Example 15

The ethylene-acrylonitrile copolymers employed in this example were prepared by a procedure similar to that described in Example 6 and had the following properties:

| | Copolymer | |
|---|---|---|
| | A | B |
| Acrylonitrile monomer unit content (percent by weight) | 33 | 38 |
| Inherent viscosity (0.1% by weight solution in dimethyl formamide at 30° C.) | 0.39 | 0.48 |

Each was compounded according to the following recipe:

| | Parts (by weight) |
|---|---|
| Copolymer | 100 |
| High abrasion furnace black | 50 |
| 2,5-bis(tert-butyl peroxy)-2,5-dimethyl hexane | 3 |
| Calcium carbonate | 3 |
| Phenylenediamine bismaleimide | 3 |

Rubbery vulcanizates were made by heating these compositions in a mold for one hour at 160° C. Strips, cut from these products, were immersed in various solvents for 7 days at 25° C. except the test in ASTM No. 3 oil was run at 100° C. The following data were obtained:

| Solvent | Percent Swell | |
|---|---|---|
| | A | B |
| Toluene | 104 | 89 |
| n-Heptane | 64 | 67 |
| Acetone | 130 | 132 |
| ASTM No. 3 oil | 22 | 6 to 15 |

*Example 16*

Into a 200-milliliter stainless steel shaker tube there were charged by the method of Example 1 a solution consisting of: 60 parts methyl formate, 0.05 part azodicyclohexane carbonitrile, 1.6 parts acrylonitrile and 0.16 part allyl acrylate. The shaker tube was then pressured with 98 parts of ethylene which were added in stages to raise the pressure to 2800 atmospheres at 95° C. The tube was heated eighty minutes at 95° C. under 2800 atmospheres pressure while being rapidly agitated. After the tube had been cooled, the ethylene/acrylonitrile/allyl acrylate copolymer was isolated by the method of Example 3. The yield was 0.61 part of a tough strong elastomer, which had an inherent viscosity of 0.70 (0.1% solution in dimethyl formamide at 30° C. with 96% soluble). The Kjeldahl nitrogen analysis was 11.0, indicating that the elastomer had 41.7 percent by weight acrylonitrile monomer units. The ethylene monomer unit content was 48.5 percent by weight. The elastomer analyzed for 76.2 percent carbon and 10.0 percent hydrogen. The molar proportions of the three monomers in the copolymer were 1.98 ethylene:(0.9 acrylonitrile+0.1 allyl acrylate).

*Example 17*

Into a 200-milliliter stainless steel shaker tube there was charged by the method of Example 1 a solution consisting of: 70 parts benzene, 0.05 part azodicyclohexane carbonitrile, 1.6 parts acrylonitrile and 0.16 part allyl methacrylate. The shaker tube was pressured with 88 parts ethylene, added in stages to raise the pressure to 2790 atmospheres at 95° C. The tube then was heated while rapidly agitated for eighty minutes at 95° C. at 2790 atmospheres, and cooled. The ethylene/acrylonitrile/allyl methacrylate copolymer, isolated by the method of Example 3, weighed 0.45 part. It was a strong tough elastomer, which had an inherent viscosity of 0.75 (a 0.1% solution in dimethyl formamide at 30° C. with only 10 percent soluble). The Kjeldahl nitrogen analysis was 12.1 percent, indicating 45.8 percent by weight acrylonitrile monomer units in the elastomer. The elastomer had 76.1 percent carbon and 10.1 percent hydrogen. The ethylene monomer unit content was 47.5 percent by weight. The molar proportions of the three monomers in the copolymer were 1.85 ethylene:(0.94 acrylonitrile+0.06 allyl methacrylate).

*Example 18*

A 200-cc. stainless steel shaker tube was charged with 1.55 grams of acrylonitrile, closed, chilled thoroughly in crushed solid carbon dioxide, evacuated 5 times and refilled with nitrogen 4 times. At 30° C. the bomb was then charged with ethylene to a pressure of 600 atmospheres; while heating was applied, more ethylene was added at 170 and 220° C. to give pressures of 2000 and 2400 atmospheres, respectively. After the mixture had been held for 30 minutes at 2400 atmospheres, the following components were injected in order: 0.4 gram of ethylene, 1.2 grams of a catalyst-monomer composition (containing 62.5 grams ethylene, 37.5 grams acrylonitrile and 0.487 milligram di-tert-butyl peroxide), and 0.87 gram of ethylene. The copolymerization reaction was run for 10 minutes at 220° C. at 2650 atmospheres.

In all, 108 grams of ethylene and 1.96 grams of ethylene were charged (55 grams E:gram AN; 104 gram-moles E:gram-mole AN). Final mole ratio E/AN=153:1. The catalyst supplied weighed 0.0058 mg. (4.0×10⁻⁸ gram-moles).

The heat was then cut and the shaker tube was allowed to cool to room temperature. Unreacted ethylene was vented. The solid copolymer product was removed and dissolved in chloroform. After the resulting solution had been filtered to remove foreign matter, the chloroform was evaporated.

The uniform elastomeric copolymer obtained in about 35% conversion (based on acrylonitrile) had an inherent viscosity of 1.01 (0.1% by weight solution in chloroform at 30° C.) and contained 28.5% acrylonitrile monomer units and 71.5% ethylene monomer units by weight; molar ratio E/AN=4.75.

*Example 19*

A 200-cc. stainless steel shaker tube was charged with a solution containing 0.25 milligram of di-tert-butyl peroxide and 1.68 grams of acrylonitrile. Then it was closed, chilled thoroughly in crushed solid carbon dioxide, evacuated 5 times and refilled with nitrogen 4 times. Then 114 grams of ethylene was introduced; mole ratio E/AN=126. After the temperature had been raised to 150° C. the initial pressure was 2900 atmospheres. When the pressure had fallen to 2824 atmospheres, the tube was cooled to room temperature and vented. The copolymer, isolated by the procedure of Example 18, weighed 0.46 gram (9.5% conversion based on acrylonitrile), exhibited an inherent viscosity of 1.82 (0.1% by weight solution in CHCl₃, 30° C.) and contained 35% acrylonitrile monomer units and 65% ethylene monomer units by weight; molar ratio E/AN=3.50.

As many widely different embodiments of this invention may be made without departing from the spirit and scope thereof, it is to be understood that this invention is not limited to the specific embodiments thereof except as defined in the appended claims.

What is claimed is:

1. A uniform, amorphous, elastomeric copolymer consisting of statistically distributed monomer units of (a) ethylene, (b) acrylonitrile, and (c)

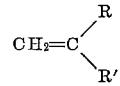

in the molar proportions of (1.7 to 5 (a):[m(b)+n(c)], wherein n is from 0 to 0.1 and (m+n) equals 1.0, the ratio of (a):(b)+(c) ranging from 1.7 to 5.0:1; R is selected from the group consisting of hydrogen and a methyl radical and R' is a radical selected from the group consisting of —COOH, —CONH₂, —COOCH₂CH₂OH,

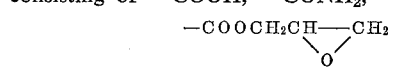

—COOCH₂CH=CH₂, —COOCH₂CH₂Cl and

2. A uniform, amorphous ethylene-acrylonitrile elastomeric copolymer containing from 1.7 to 5.0 moles of ethylene monomer units per mole of acrylonitrile monomer units, said monomer units being statistically distributed.

3. A uniform, amorphous ethylene-acrylonitrile elastomeric copolymer containing from 2.0 to 4.0 moles of ethylene monomer units per mole of acrylonitrile monomer units, said monomer units being statistically distributed.

References Cited by the Examiner

UNITED STATES PATENTS 2,650,913   9/1953   Boyd ------------ 260—85.5

OTHER REFERENCES

"The Chemistry of Acrylonitrile," pages 32–33, 2nd, American Cyanamid Co., New York, 1959.

Akademiia Nauk S. S. S. R., Otdelenie Khimicheskikh Nauk, Izvestiia, 1958, pp. 242–3.

JOSEPH L. SCHOFER, *Primary Examiner.*

W. HOOVER, *Assistant Examiner.*